United States Patent
Van Wandelen

[11] 3,825,748
[45] July 23, 1974

[54] CAMERA AIMING STRUCTURE
[75] Inventor: Henri Van Wandelen, San Carlos, Calif.
[73] Assignee: Photo-Control Corporation, Minneapolis, Minn.
[22] Filed: Sept. 24, 1973
[21] Appl. No.: 399,928

[52] U.S. Cl. ............ 250/221, 250/203, 250/214 P, 95/11 R, 95/12.5
[51] Int. Cl. .............................................. G01j 1/20
[58] Field of Search.......... 250/203 R, 203 CT, 210, 250/221, 222, 214 P; 170/DIG. 21; 356/141, 145, 146, 152; 95/11 R, 12.5, 44 C; 307/117

[56] References Cited
UNITED STATES PATENTS

| | | | |
|---|---|---|---|
| 3,419,674 | 12/1968 | Burns et al. | 250/203 X |
| 3,470,377 | 9/1969 | LeFebre et al. | 250/210 X |
| 3,602,717 | 8/1971 | Konig | 250/210 X |
| 3,652,160 | 3/1972 | Odone et al. | 95/44 C X |
| 3,736,057 | 5/1973 | Harvey | 95/44 C X |

*Primary Examiner*—Walter Stolwein
*Attorney, Agent, or Firm*—Schroeder Siegfried Ryan and Vidas

[57] ABSTRACT

The camera aiming structure in which a camera has associated therewith a lens and photo detecting apparatus together with a motor control circuitry and drive motor or motors adapted to orient the camera on a support or about one or more pivot axes to realign or align the camera with a subject in front of the same, the subject appearing in front of a lighted background so that the photo detecting lens and photo detecting apparatus sees a desired amount of light with respect to the subject to establish a reference position and detect change of the subject from a reference position.

16 Claims, 9 Drawing Figures

IMAGE OF SILHOUETTE

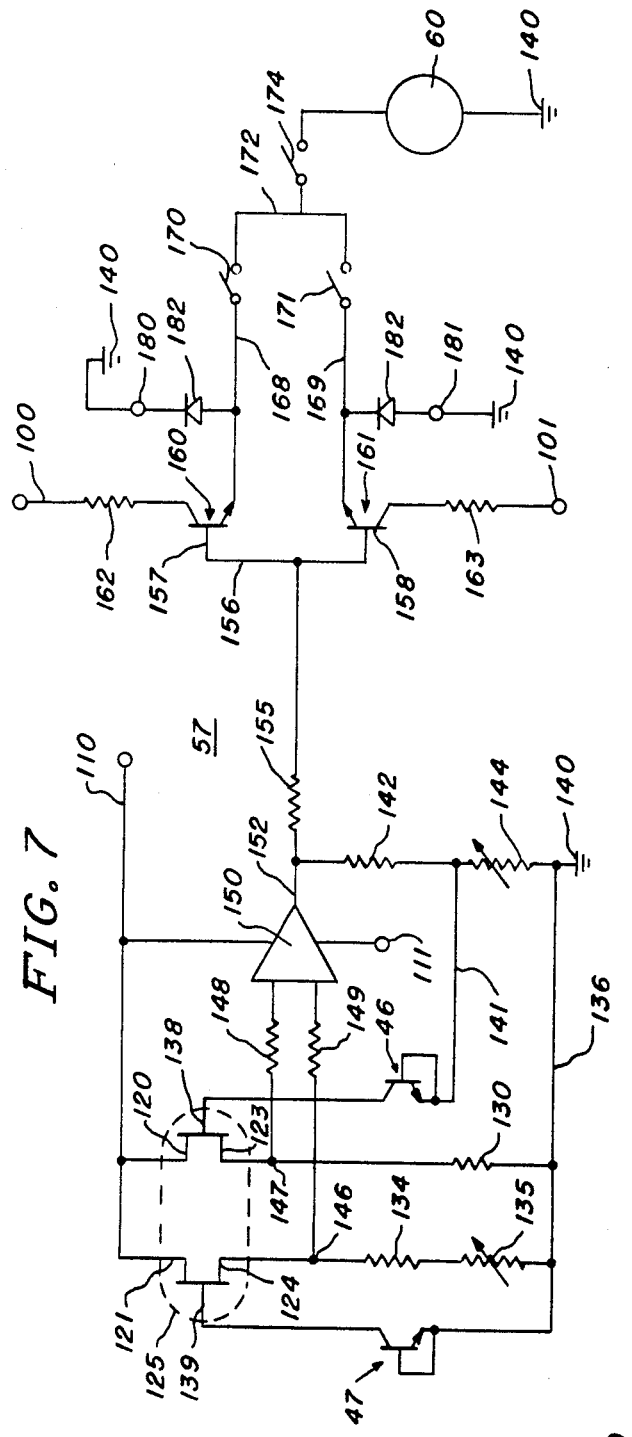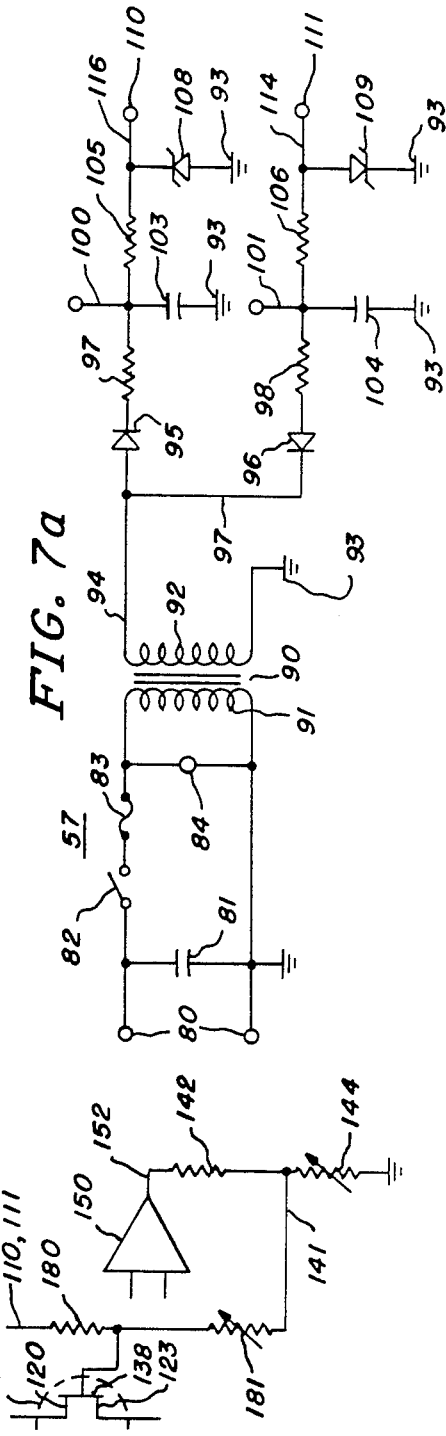

CAMERA AIMING STRUCTURE

This invention relates to a camera aiming or aligning device and more particularly to an improved camera mounting structure and control therefor which facilitates an initial setup of a subject for the photographic purposes against background light and automatically aims the camera to the same referenced position with respect to the subject should the subject move or alter its position after initial alignment and before a picture is taken.

At the present time, alignment of cameras or aiming of camera in portrait photography or photography in general, is accomplished manually by the operator. Similarly, television or movie cameras though hand operated, may be mounted for pivotal movement and may or may not include motive means for positioning the same. Surveillance equipment such as television cameras, have been constructed to be driven on a support in an oscillating manner continuously without reference to a particular subject. In the field of portrait photographs, however, camera aiming or aligning has always been effected manually since the photographer desires to center his subject in the center of the resulting picture. Thus, the camera is initially aimed or aligned on the subject by viewing the same through a lens and adjusting the camera position accordingly. However, before a picture is snapped or taken and the film exposed, the photographer will normally leave the position behind the camera and stand to the side of the same or slightly forward of the camera to view the background and subject as a whole for proper expression and overall composition. Often the subject will move from side to side or forward to disturb the previous alignment. It is particularly true in the photographing of small children or in mass photography projects where a number of subjects are to be photographed. As a result, the number of lost shots occur and additional time is consumed in realigning the camera.

Thus, the present invention is particularly adapted for use in the portrait photography but may have other applications. In the present invention, the camera is coupled to the support by means of a motor drive system having a suitable lens and photocell detecting means together with an electronic circuit for driving the motor associated therewith. Once the subject is set in the camera view finder in the exact position in which the photographer would like to have the subject appear in the resulting photograph, the photocells are adjusted so that a background light seen from either side of the subject or from the top of its head will establish a reference. This background lighting may include reflection from the subject or the reflected light alone may be used as a reference against a darker background. In the control circuit for the motor a pair of photocells or a photocell compensated by a resistance or voltage source connected in a suitable bridge circuit establishes electrically a reference position. At such time the camera will be properly aimed and the photographer may then move out from behind the camera to consider other aspects of the photograph, such as appearance of the subject etc, without considering the re-aiming of the camera should the subject move. Prior to the actual taking of the picture, a circuit may be established allowing the photocells to sense any differential from the original position by virtue of the difference in light seen through the special lens focusing background light behind the subject or reflected light on the photocell detector and the resulting differential signal used to energize the motors through the control circuit to orient the camera on the support and through the coupling about one or more pivot axis to re-aim the camera with respect to the subject until the photocells see the same amount of light which are originally established in the set up of the camera. At this point, the motor will be de-energized the camera is ready or re-aimed for the actual taking of the picture. The photographer with suitable controls may then complete the taking of the photograph by snapping of the camera and simultaneously illuminating or adding automatically whatever light is necessary to the background light for proper exposure to provide successful photography from the standpoint of properly orienting the subject in the resulting picture. This minimizes lost time and lost shots in that the camera need not be re-aimed manually and a number of subjects may be photographed without the delay of having to recheck the camera before taking of a picture once the particular subject has been aligned and the camera adjusted. The particular camera may be mounted on a suitable support structure which journals the same on a conventional tripod so that the camera may be pivoted about one or more axis on the tripod or support. Suitable photocell detectors may be included in the coupling structure along with a special viewing lens or the camera lens may be utilized for this purpose and the camera modified to include photocell detectors therein. These detectors will be connected into a bridge circuit and used to drive a differential amplifier which in turn selectively switches a pair of electronic switches to provide opposite polarity energization to a direct current motor for driving the support structure relative to the tripod to reorient the camera. Suitable limit switches are included in the control circuit to limit pivotal movement in the drive plane of the motors and a control switch in the energizing circuit will allow for motor operation only at the direction of the photographer who will, when he is ready to take the picture, complete the energization circuit and allow the re-aiming of the camera on a subject immediately prior to the shooting or taking of a picture. The control switch for controlling the camera aiming device may be incorporated into the conventional control cord or cable presently employed in portrait photography which allows the photographer to stand away from the camera during the actual taking of the picture. Thus, re-aiming will be accomplished at a time immediately prior to the taking of the picture to minimize any chances of movement during the actual picture taking process and the same control may be utilized in the conventional manner for actually taking of the picture and initiating the lighting necessary to properly photograph the subject.

The same basic structure and principle may be applied with respect to television cameras wherein they are incorporated as part of the telecommunication system and are focused on a particular subject. At such time, a suitable control switch can initiate the same type of aiming circuit based on background or reflected light seen by the camera lens or a separate lens and photocell structure or photo detector structure associated with the photocontrol to continuously aim the camera at a subject such that the detecting circuit will see the same amount of background or reflected light at all times.

It is therefore the principle object of this invention to provide a camera aiming or aligning structure adapted to center the subject in a photograph and against a lighted or contrasting background.

Another object of this invention is to provide an improved camera following system which will enable a camera aiming system to continuously follow a subject against a lighted or contrasting background.

A still further object of this invention is to provide an improved camera aiming system which will automatically re-aim or align a camera relative to the contrasting background with the subject in front of the same after initial setting to maintain the camera in the same relationship with respect to the subject as the initial setting.

A still further object of this invention is to provide in a camera aiming system an improved, simplified, solid state electronic motor control circuit for aiming the camera.

Another object of this invention is to provide in a camera aiming structure a simplified apparatus which will align or aim a camera on a support automatically prior to taking a picture.

A further object of this invention is to provide a camera aiming structure adapted to orient a camera on a support in two directions of movement relative to a subject for the purpose of aligning a subject in a resulting portrait and picture.

These and other oejects of this invention will become apparent from reading of the attached description together with the drawings therein:

FIG. 7 is a schematic circuit diagram of a control circuit for the improved camera aiming device.

FIG. 7A is a schematic circuit diagram of the power supply portion of the control circuit, and, FIG. 7B is a fragmentary portion of the control circuit to be used in conjunction with the circuit of FIG. 7 as an indication of a second axis of movement or alignment.

Figure 1:
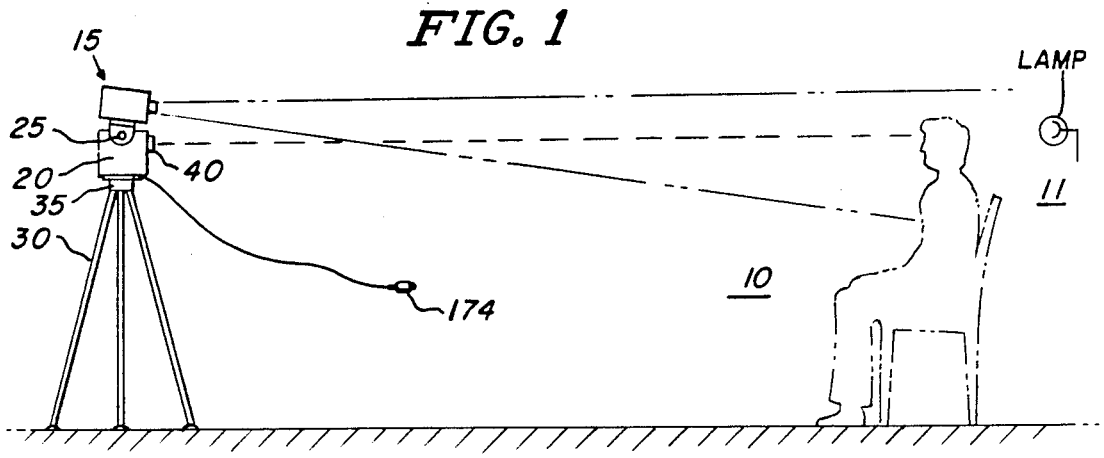
FIG. 1 is an elevation view of an improved camera aiming system or structure showing the application of the same to a subject.
Figure 2:
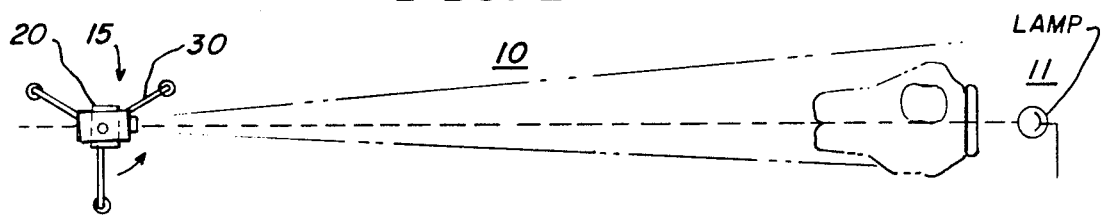
FIG. 2 is a plan view of the structure or system of FIG. 1 showing an axis of alignment of the camera aiming system.

The invention in the camera aiming structure is shown in FIGS. 1 and 2 in an application of the same. It depicts an arrangement for portrait photography in which a subject, indicated at 10, who may be seated or standing, is placed in front of the background lighting, indicated schematically at 11. The background light may be replaced in whole or in part by reflected light from the subject and hence the lighting seen by the aiming structure should be contrasting to provide the reference for the photo detecting apparatus to be hereinafter defined. In FIG. 1, the camera is shown schematically at 15 which is pivotally mounted on a support 20 with the support in turn being mounted on a tripod or base 30. The camera, as shown in FIGS. 1 and 2, is pivoted about a horizontal axis on the support, as indicated by the pivots 25 and the support structure in turn is carried by pivot arrangement on the tripod, as indicated by the journal member 35 and the arrow in FIG. 2. Within the support member is indicated schematically a special lens 40, or the camera itself may use its own lens as a means for collecting background illumination. Where background illumination is used, it is a very soft light which will normally be directed from behind the subject and to either side of the top of the same to be focused on the photo detecting apparatus, to be later defined within the support or camera as the case may be. The collected background light on the photo detecting apparatus is indicated generally by the dotted lines in FIGS. 1 and 2 as the light coming from above and either side of the subject which is focused by the lens 40 or camera lens on the photo detecting apparatus in the aiming structure or device. Reflected light will be seen from the subject against a darker background in the same manner. Initially, the camera is set up by the photographer or operator so that the particular subject is viewed in the view finder or oriented therein to the desire of the operator or photographer. Normally, this would be centered within the view seen by the photographer corresponding to the location of the subject with respect to the resulting picture to be taken. If the subject should shift its position either from side to side depicting one axis or line of movement or should move forward or backward, stretch or hunch over, another line of movement or a vertical orientation will be affected. It will be recognized that background light will be seen only above the head since the body of the subject would block any background light with respect to the camera lens. However, the second axis of movement or line of movement can be detected and the camera re-aimed or aligned automatically hereinafter defined.

Figure 3:
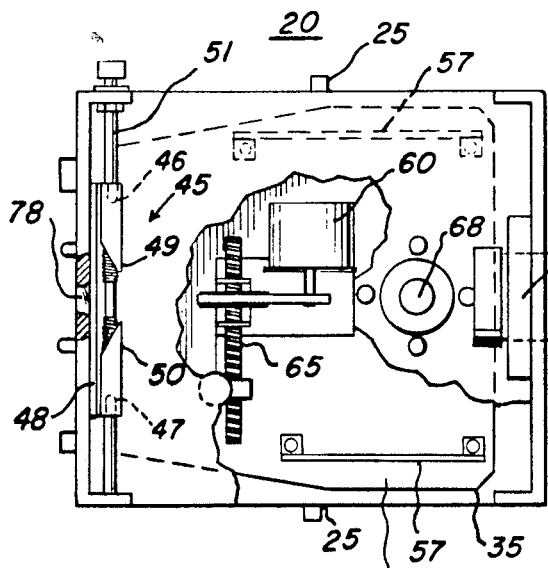
FIG. 3 is a sectional view of the camera support of the improved camera aiming system with parts broken away.
Figure 4:
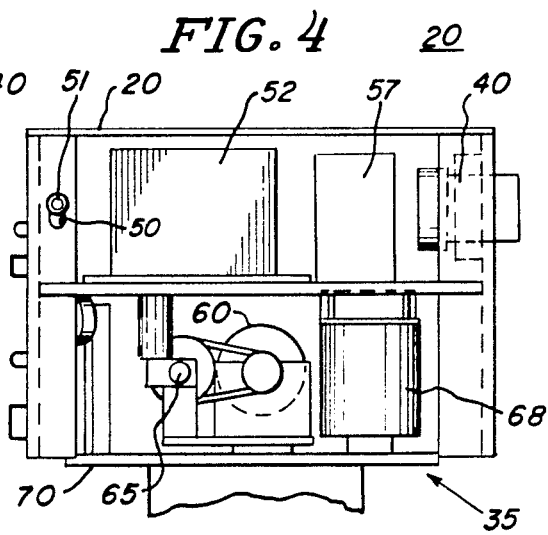
FIG. 4 is a side elevation view of the support of FIG. 3 with parts in section.

For the purpose of the present disclosure, the structure of FIGS. 3 and 4 show schematically the support or box-like structure through which the camera is coupled to the tripod or base 30. For simplicity in FIGS. 3 and 4 details of the horizontal axis of pivot of the camera on the support are omitted since it will be recognized that a suitable drive motor for this axis of movement or pivot and appropriate controls circuitry may be similarly employed in the structure to be hereinafter described. Thus, in FIGS. 3 and 4, the box-like support structure or member 20 is shown in plan and elevation view with parts broken away and the section to disclose relationship of parts. The lens 40 is centered in the support and normally aligned so that it will see basically the same view as the camera lens. The light collected from either side of the subject will be focused on a photocell detecting apparatus, indicated generally at 45, and composed of a pair of photo transistor members 46 and 47 mounted in holder members 49, and 50 respectively attached to the frame 48 positioned on the back of the box. A shaft 51 carries holder members 49, 50 of the photo transistors and is threaded through a portion of the holder members to adjust the spacing between the holder members of the photo transistors.

Figure 5:
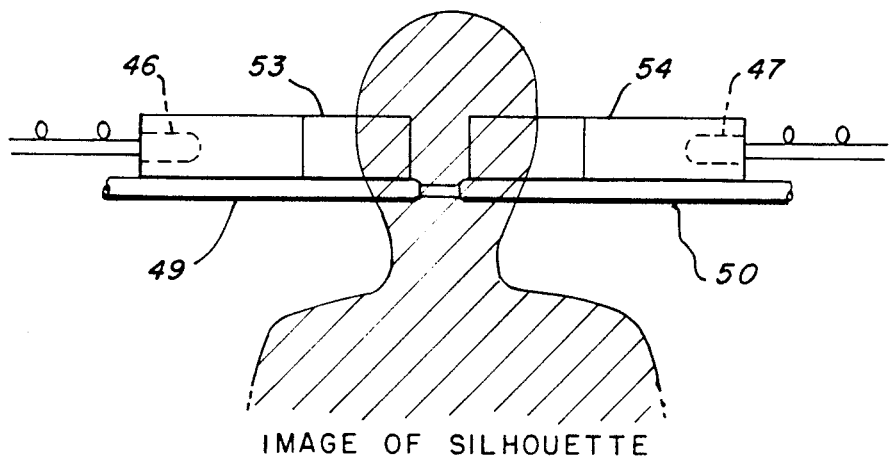
FIG. 5 is a schematic view of an image of a silhouette as seen through the aligning structure and lens in FIGS. 3 & 4 showing the position of the holders and sensor shields for the photo transistors in front of the same.
Figure 6:
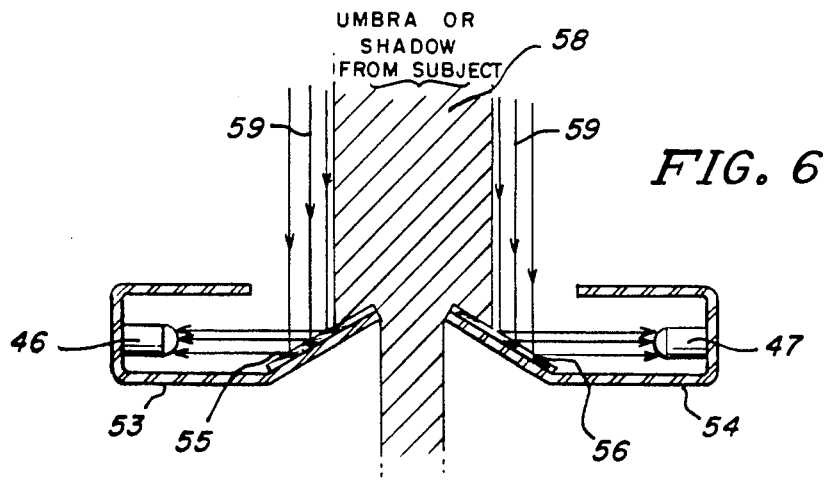
FIG. 6 is a schematic plan view in section showing the sensor shield portion of the photo transistor mounts together with the light falling upon the same.

As shown schematically in FIGS. 5 and 6, as viewed through the lens of the support or range finder of the camera, the image of the silhouette will appear dark and holder members 49 and 50 with the shaft 51 carrying the same, will be positioned generally to either side of the silhouette with a spacing therebetween. The holder members mount sensor shields 53, 54, on the same with the sensor shields having openings therein and reflected surfaces 55, 56, on the same. The photocells are actually positioned in the sensor shields in the back of the same so that reflected light from the reflected surfaces 55, 56 will fall on the same. Thus, the holder members contain angled reflective surfaces which reflect collected light from the lens onto the photo transistors 46, 47 positioned within the sensor shields 53, 54. By adjusting the spacing between the shields or the holder members, the spacing of the same relative to the head of the silhouette may be adjusted to accommodate varying sizes of subjects or varying sizes of hairdos. The reflective surfaces may be made of any suitable material and in effect are little light scoops which change the angle of the light directed thereon to focus the same on the photocells in the back of the sensor shield. The photo sensors themselves are photo diodes which are extremely small in diameter and are mounted in the base of each shield to receive the light therefrom. By adjusting the spacing the sensitive area may be elongated in the horizontal plane so that the image of the head can vary considerably in size from Afro hairdos down to little babies and the photocells can still be utilized to sense light from either side of the same or light reflected therefrom as contrasting light to be sensitive over a wider range in the horizontal axis. Thus where background light is received, and as will be seen in FIG. 6, the background light from either side of the subject as indicated by the numeral 59 will fall on the reflector surfaces 55, 56 and be focused on the photocells 46, 47, with the umbra or shadow 58 from the subject providing the area of contrast. Where reflected light is used, the light behind the subject will be eliminated and the light directed on the subject from the front will show as reflected light against a darker background so that the adjusting of the sensor shields may be spaced to receive the reflected light against the edge of the contrasting area. The principle is that whenever the silhouette moves to obscure more of one reflector than the other an unbalance in the photocell circuit to be hereinafter defined results. Thus light collected by the lens 40 will be focused on the photo transistors 46, 47, since the spacing or midpoint between the photo transistors is aligned with the center of the lens in the upper portion of the support structure and these shields mounting the photo transistors are adjusted with respect to this reference point back and forth, toward or away from one another.

Suitable electronic circuitry 57 and a power transformer are indicated generally at 52 and are included in the upper and lower portions of the box-like structure and to one side of the lens so as not to obstruct light focused from the lens to the photo transistors. The lower portion of the box-like structure includes a drive motor 60 operating through gearing 65 and pivot member 68 to the plate 70 forming the journal structure 35 and journaling the entire box structure about a vertical axis to orient the support member and the camera about such axis in the aiming of the camera with respect to side-to-side movement of the subject. As indicated in FIG. 3, suitable pivot points 25 are positioned on the box for the purpose of pivoting the camera thereon and a coupling with a drive motor pivoting the camera about the horizontal axis or in a vertical plane may be incorporated into the box-like structure together with an appropriate drive circuitry. Suitable photocell detecting equipment or photo transistors may similarly be included within the box to receive light from the collecting lens in a vertical direction. These are omitted herein for simplicity since they would be similar to the axis of movement disclosed in FIGS. 3 and 4. It will be understood in the vertical line of movement only single photo sensor will be used and a suitable reference may be applied to supply a voltage signal to the control circuit so that the output of the single photo sensor in the vertical axis may be adjusted against the reference to obtain the necessary or desired amount of background light above the head of the subject to orient the camera in the vertical direction. FIGS. 3 and 4 show switches, adjusting knobs and indicating lights positioned on the rear side of the support ember from which the operator would normally aim the camera to orient the subject initially. In this sense, a viewing aperture 78 would be included in the back of the enclosure.

While I have disclosed herein the photocell and collecting lens incorporated into the support structure, it would be well recognized that the camera lens may be utilized for this purpose and the camera modified to insert the photocells therein in the rear end of the same with the support member or coupling carrying the necessary electronic control circuitry and drive motors.

A clearer understanding of the aiming control will be found in the control circuitry of FIGS. 7, 7A and 7B. Thus in the FIGS. 7 and 7A, the number 57 indicates generally the control equipment and the power supply with the number 60 indicating the drive motor shown in FIGS. 3 and 4. The circuit diagram 7A shows the power supply for the control circuitry. It utilizes an alternating current source, preferably a 110 volt 60 cycle supply, indicated by the input conductors 80. A capacitor 81, on/off switch 82, and fuse 83 together with an indicating light 84 are positioned on the inlet side of the transformer, indicated specifically at 90, and connected to the power supply 80 through its primary winding 91. The indicating light 84 is positioned across the power supply to indicate that power is applied to the transformer with closure of the switch 82. The secondary winding 92 of the power transformer 90 is grounded at one extremity, as indicated at 93, with the opposite extremity 94 being connected to a pair of diodes, 95, 96, connected through a common connection 97. The diodes are oppositely poled to rectify alternate half cycles of the current of the stepdown voltage wave impressed thereon from the secondary winding 92. The diodes 95, 96, have voltage dropping resistors 97, 98 connected in series circuit therewith and voltage power supply terminals 100, 101, are taken at the opposite ends of the dropping resistors from the diodes 95, 96, with suitable filter capacitors 103, 104 being connected at these voltage points and to the ground connection 93. Thus, a reduced DC voltage will be obtained at the voltage terminal points 100, 101, for the power supply purposes and these will be of reduced magnitude and of opposite polarity. For example, the voltage points 100 and 101 will be + and − 30 volts for the purpose of energizing components of the control circuit and motor drive circuit as will be hereinafter defined. Further voltage dropping resistors 105, 106, are connected to the voltage points 100, 101 to provide the voltage output points 110, 111, with suitable Zener diodes 108, 109, being connected to these output points and to the ground connection 93. These points 110, 111, will be of further reduced voltage as for example + or − 15 volts with the Zener diodes providing the finer regulated voltage at this point.

In the control circuit of FIG. 7, the terminal 110 or the 15 volt plus DC regulated voltage is fed to source electrodes 120, 121 of the dual field effect transistor 125. These transistors form two legs of a bridge comparison circuit whose drain electrodes 123, 124, are connected to resistance legs forming the opposite side of the bridge. Thus, drain electrode 123 is connected to resistor 130 and drain electrode 124 is connected to resistor 134 and adjustable resistor 135 in series circuit with the opposite legs of the bridge being connected in common at conductor 136 leading to ground connection 140. The photo transistors 46, 47, forming the photo electric detecting portion of the circuit are respectively connected to the gate electrodes 138, 139, respectively of the field effect transistors or the dual transistor 125 with the opposite extremity of the photo transistor 47 being connected to the common conductor 136 and ground 140. The opposite side of the photo transistor 46 is connected through a conductor 141 to a sensitivity control in the form of a fixed resistor 142 and an adjustable resistor 144 in series, with the conductor 141 connected to the mid-point of the same and the adjustable resistor being grounded at 140. The output of the bridge is taken at points 146, 147 and connected through resistors 148, 149, respectively to the differential input of the amplifier 150 which is fed on one side from the positive 15 volt DC source or conductor 110 and on the opposite side by the negative 15 volt DC source or terminal 111. The output terminal of the differential amplifier 150, as evidenced by the conductor 152, is connected to the sensitivity control or resistors 142, 144 to ground 140 and is also connected through a load resistor 155 to a common conductor 156 leading to the base electrodes 157, 158 respectively of the electronic switches or transistors 160, 161, respectively. Transistor 160 has its collector electrode connected through a bias resistor 162 to the + DC source of higher voltage or terminal 100, such as the + 30 DC source with the collector of the transistor or switch 161 being connected thorugh a bias resistor 163 to through negative or higher voltage DC source or terminal 101 representing the − 30 volt DC source. The emitter electrodes of each of the transistors are connected through output conductors 168, 169, and normally closed limit switches 170, 171, respectively to a common conductor 172 leading to a remote manually operated switch 174 controlling the energization of the motor 60. Thus switch 174 has its opposite side connected to the DC motor 60 which circuit is completed through the ground connection 140 on the opposite side of the motor. Suitable indicating lights 180, and 181 having diodes 182 and 183 respectively in a series therewith are connected to the output or emitter electrodes of the respective transistors or switches 160, 161, with the opposite sides of the indicating lights grounded as at 140 to provide directional indicating lights whenever respective transistors 160, 161, are conducting. The control circuit shown in FIG. 7 represents one axis of movement, orientation or aiming of the improved camera aiming device. The photo transistors 46, 47 are adapted to be adjusted and energized so that whenever the subject is properly oriented in front of the camera and the lens 40, an equal amount of light will be received by both photo transistors and each will generate a voltage of the gate electrodes 138, 139, respectively of the dual field effect transistor 125. The source to drain electrodes of each side of the dual transistor represent a fixed resistance or given resistance and each form a leg of the bridge circuit. The photo transistors when receiving differential amounts of light, will provide different gate control signals to the sides of the dual transistors changing the source to drain the resistance by allowing conduction of the field effect transistors. This will effectively unbalance the bridge circuit formed by the resistance components and provide a differential output between the output diagonals or points 146, 147, of the bridge applying a differential voltage on the respective bias resistors 148, 149, at the input side of the differential amplifier 150. When less light is seen by one of the photo transistors, it will conduct less gate current. Thus, with the presence of less gate current, one of the other of the sides of the transistor 125 will have less source to drain resistance creating an unbalance in the bridge across the output points 146, 147. The unbalance created at the bridge across these points is supplied to the differential amplifier in terms of differential inputs thereto. If the unbalance is in the positive direction, the output of the operational amplifier 150 will be positive, thus applying a forward bias to emitter junction 160. Once the transistor 160 conducts and supplies a positive 30 volt to the motor 60 and the lamp 180, assuming the manual switch 174 or the switch normally in the hands of the photographer is closed, motor 60 will run and drive the support structure 20 and hence the camera, in a direction to correct the unbalance of the bridge to bring the camera back into its position of initial aiming or alignment. The initial setting of the control circuit is such that the photographer or operator viewing the subject either through the camera lens (the view finder) or through the lens 40 will align the subject in the proposed picture such that it will be positioned therein so that an equal amount of background light will be seen on the same and the transistors will be in balance. Should the transistor not be in balance, adjustment of the resistor 135 will adjust the balance of the bridge so that the indicating lights 180, 181, will be out indicating that the control circuit is balanced for the initial setting. The sensitivity control adjustment is obtained from the output of the amplifier 150 through the output conductor 152 and the resistance network 142, 144, the latter resistor being adjustable. A portion of this output is fed back in series with the photo transistor 146 to the negative resistance or input side of the amplifier 150. The amount of light received by the photo transistors may similarly be adjustable by the movement of the shaft 150 to increase or diminish the amount of photo transistors receiving light through the lens 40.

Thus with the initial set up of the camera in the side-to-side direction, the camera aiming device will be set so that the operator or photographer may move around to the side of the same and check conditions of the subject and background before taking the picture. Before proceeding with the same, he will operate the hand switch 174 which will automatically energize the circuit in the event that the subject has moved from side to side, the photo transistors 46 and 47 in the bridge circuit will sense the unbalance and cause the motor 60 to drive in such a direction to bring the camera back to its initial position of setting wherein the figure or subject will be aligned with the lens 40.

Whenever the apparatus is set to utilize the two axis of movement, that is side-to-side and vertical movement, as the photographer or operator sees a subject through the camera lens, the adjustment of the camera on the base or tripod will be about two axes, one horizontal and one vertical to provide pivotal movement over a limited range which will effect setting or aiming from side to side and also a vertical respect. It will be understood, although not shown in detail, that the second axis of movement will similarly incorporate a drive motor of the DC type, at least one photo transistor in a bridge circuit and a separate control channel operating from a power supply, such as shown in FIG. 7 which control circuit will be basically the same as that shown in FIG. 7. Certain modifications, such as shown in FIG. 7B will be utilized to take the place of the second photo transistor which would normally be in the upper most position vertically but would be ineffective since no light would come through the body of the subject. Thus, as shown in FIG. 7B, and in place of the photo transistor 46, the gate electrode 138 of one/half of the field effect transistor or dual transistor 125 would be connected through a separate voltage providing network to receive voltage signal therefrom in lieu of the photo transistors. Thus, as shown in FIG. 7B one or the other of the power supply conductors 110, 111, would be connected through a voltage dividing network formed of a fixed resistor 180 and an adjustable resistor 181 such that the voltage level of the dividing network could be adjusted such so that the drain electrode would receive a proper bias signal corresponding to the signal applied from the opposite photo transistor to keep the bridge circuit in balance. As seen in FIG. 7B, the differential amplifier would again have its output conductor connected through the voltage dividing network 142, 144, to ground with the conductor 141 leading to the opposite end of the adjustable resistor 181 so that the sensitivity control would be connected with the voltage dividing network and the adjustable resistor would be adjusted for balancing the proper amount of light seen by the operator over the head of the subject in the initial aiming of the camera. Thereafter, the movement representing vertical displacement of the subject with respect to the lens and the background light would allow more or less background light to be seen by the opposite photo transistor or transistor 47. This would effect an unbalance of the bridge causing the motor to drive the associated motor such as the equivalent of motor 60 to drive the camera through the gearing in a horizontal axis to pivot the same in a vertical plane bringing the camera back to an aiming position with respect to the subject to orient the subject vertically with the picture frame.

While I have disclosed my invention in connection with portrait photography in which a subject is relatively fixed or positioned in one place and an adjustment will be effected after initial set up and prior to taking of a portrait, it will be recognized that other application of the circuit may be employed. In portrait photography, the switch 174 would normally be closed after initial set up and when the photographer desires to take the picture to bring the camera back into the initial relationship with the subject, should it be altered therefrom. The operator or the photographer would have available at the same time a suitable control to take the picture and provide the proper lighting for the proper exposure of the subject and the film. Other applications of the improved camera aiming structure could include photo communication devices wherein a television camera and/or receiver in combination with a telephone would permit a user to see and be seen by the correspondent during the phone type communication. Under such circumstances, and with a camera aiming device of the present invention, an appropriate switch would be activated which would permit continuous running or operation of the motor driving a television camera to view a subject against a lighted background or with reflected light so that proper orientation of the camera could be provided to center the subject in the transcribed and transmitted picture following limited ranges of movement of the subject. The same principle as outlined in the control circuit and apparatus would be available for such the system and the operating switch could be part of the receiver microphone circuit which would permit energization of the circuit and operation of the motor during the entire operation that the phone was being used.

Therefore, in considering this invention, it should be remembered that the present disclosure is intended to be illustrative only and the scope of the invention should be determined only by the appended claims.

What is claimed is:

1. A camera aiming structure comprising, a camera, a support for mounting said camera, coupling means positioned between said support and said camera and coupling the same, said coupling means including pivot means and motor means therefore for orienting said camera in alignment with a subject in at least one direction of movement, lens means associated with said coupling means for collecting and focusing contrasting light from behind the subject, photocell detector means associated with the lens of said coupling means in spaced aligned relationship and adapted to receive light from the lens means and respond thereto, means to initially align the camera aiming structure with the subject to produce a predetermined amount of light on the photocell detector means, and circuit means including a differential amplifier for responding to a difference from the predetermined amount of light in energization of the photocell detector means from the light collected by the lens and directed to the photocell detector means to drive said motor means in a direction to diminish the output of the differential amplifier until said photocell detector means receives said predetermined amount of light from the lens indicative of alignment of the subject in the direction of motion with the lens and camera.

2. The camera aiming structure of claim 1 in which the coupling means includes two axes of pivot to align the subject in two directions of motion with respect to said camera and in which the photocell detector responsive to light from the subject is received for the two directions of motion; and included in said circuit means said photocell detector means driving separate differential amplifier means and responsive to the light differential from the detector means to control movement of the coupling and orientation of the camera about the said two axes of movement to bring the subject into alignment with the camera for said two directions of movement.

3. The camera aiming structure of claim 1 in which the lens and photocell detector means are included in the camera.

4. The camera aiming structure of claim 1 in which the coupling is a box-like structure mounting the camera and carries the lens and photocell detector means together with the motor and circuit means for orienting the same.

5. A camera aiming structure comprising, a camera, a support for mounting said camera, coupling means positioned between said support and said camera and coupling the same, said coupling means including pivot means and motor means therefor for orienting said camera in alignment with a subject in at least one direction of movement, lens means associated with said coupling means for collecting and focusing contrasting light from behind said subject, at least a pair of photocell detector means associated with the lens of said coupling means in spaced aligned relationship and adapted to receive light from the lens means and respond thereto, means to initially align the camera aiming structure with the subject to produce a predetermined amount of light on the photocell detector means, and circuit means including a differential amplifier for responding to a difference from the predetermined amount of light in energization of the photocell detector means from the light collected by the lens and directed to the photocell detector means to drive said motor means in a direction to diminish the output of the differential amplifier until each photocell detector means receives said predetermined amount of light from the lens indicative of alignment of the subject in the direction of motion with the lens and camera.

6. The camera aiming structure of claim 5 and including means positioned in said box-like structure and connected to and mounting the photocell detector means along an axis generally parallel to the line of movement of the subject in which the photocell detector means receives light from the lens, said means including means to space one of the photocell detector means relative to the other for varying the relative positions where contrasting light from the subject will fall on the pair of photocell detector means.

7. The camera aiming structure of claim 6 in which the means mounting the photocell detector means includes an adjustable screw shaft means positioned in the box-like structure to provide for movement of one of the photocell detector means toward and away from the other.

8. The camera aiming structure of claim 5 in which the photocell detector means are photo transistors connected in a bridge type network whose output feeds the differential amplifier to control the operation of the motor means.

9. The camera aiming structure of claim 8 in which the circuit means including the photo transistors connected in the bridge type network provide a differential output to the amplifier means which selectively controls a pair of electronic switches selectively connecting positive and negative DC source supplies to the motor means in the form of a DC motor to drive the coupling means and hence the camera relative to the support until a balance is obtained in the bridge type network indicative of an adjusted amount of light being received by the photo transistors corresponding to an initial setting.

10. The camera aiming structure of claim 9 in which the bridge type network includes in addition to the photo transistors additional legs including an adjustable resistor in a leg of the bridge type network to compensate for the difference in light levels received by the photo transistors.

11. The camera aiming structure of claim 10 in which the circuit means from the electronic switches to the DC motor includes a pair of limit switches which limit movement in either direction of rotation of the motor beyond a predetermined rotation of pivot.

12. The camera aiming structure of claim 11 and including additional switch means connected in circuit with the DC motor and adapted to initiate operation of the motor with operation of the switches and in response to the output of the bridge circuit controlling the differential amplifier.

13. The camera aiming structure of claim 12 in which an additional switch means is coupled with remote control means and includes an additional remote control adapted to be operated with a switch means in sequence and selectively for aligning the subject with the camera and controlling the operation of the camera.

14. The camera aiming structure of claim 7 in which the photocell detector means includes mounting members for the photocells which include reflective surfaces adapted to collect contrasting light from the subject through the lens to concentrate said contrasting light on the respective photocell detector means.

15. The camera aiming structure of claim 1 in which the photo detector means includes a single photocell transistor and an adjustable voltage source connected to said circuit means to balance the differential amplifier when said single photo transistor receives a predetermined amount of light from the lens indicative of alignment of the subject in the direction of motion with the lens and camera.

16. The camera aiming structure of claim 2 in which one of the differential amplifiers corresponding to one of the directions of motion is driven from a pair of photocell detector means receiving light differentially from said lens for said direction of movement and another of said differential amplifiers includes a single photocell detector means coupled in said circuit means with an adjustable voltage source for driving said other differential amplifier means to bring the subject into alignment with the camera for said other direction of movement.

* * * * *